United States Patent Office 3,302,739
Patented Feb. 7, 1967

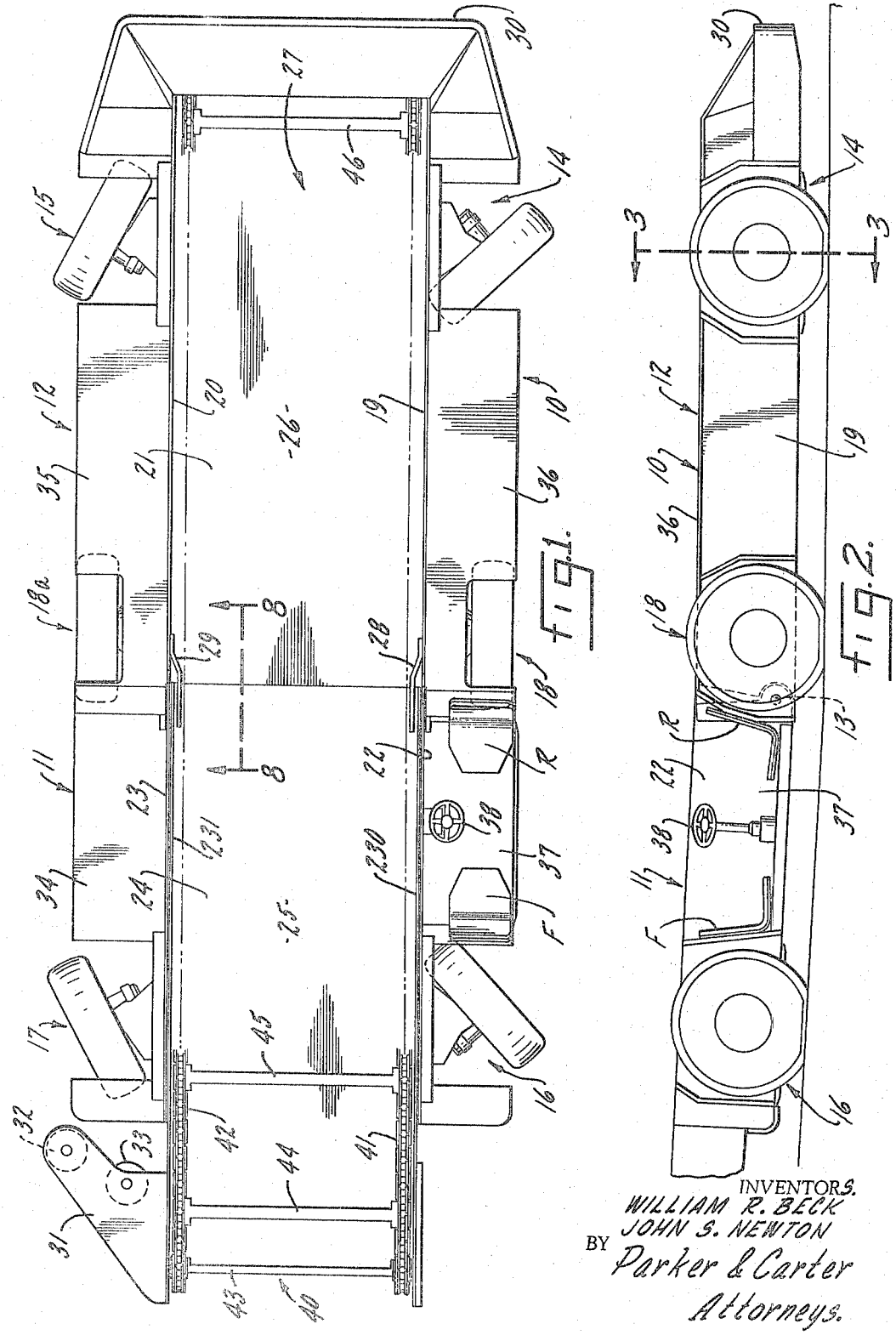

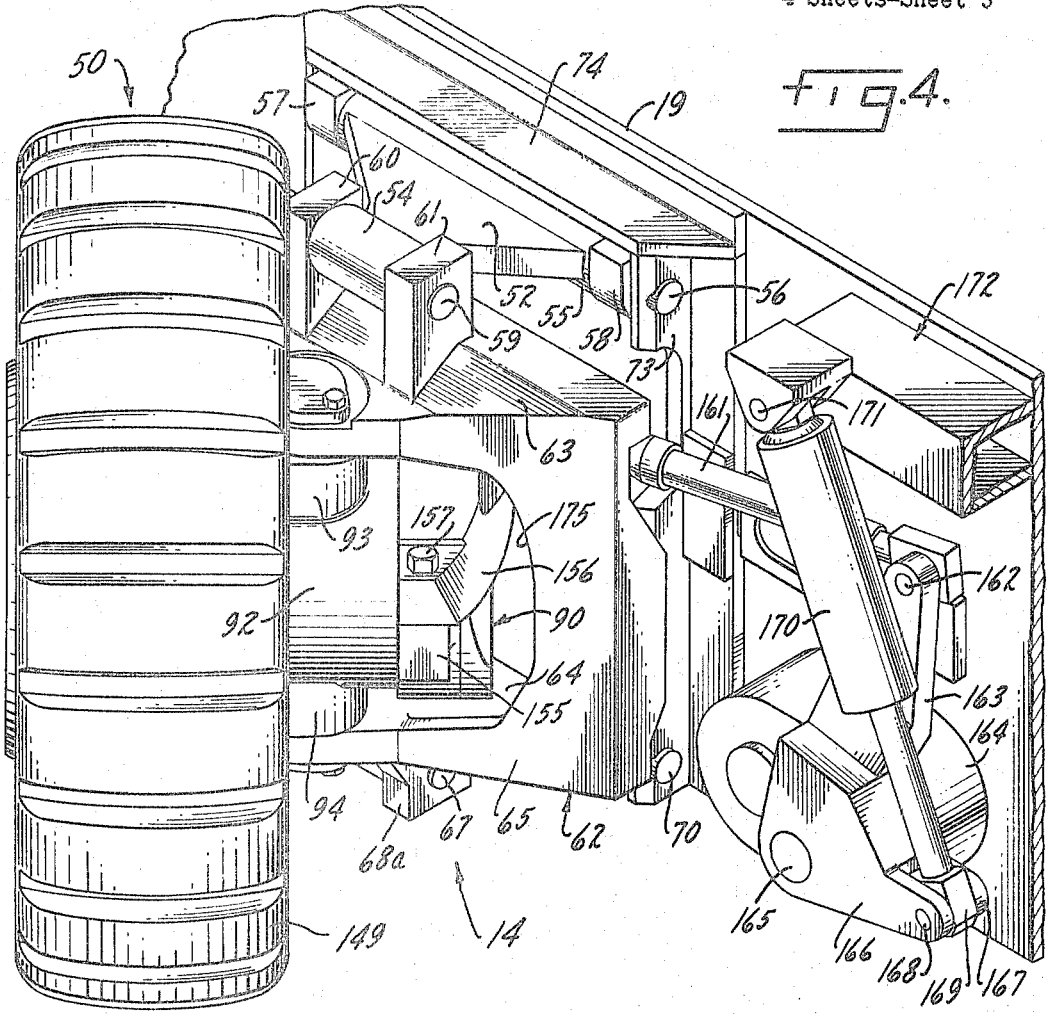
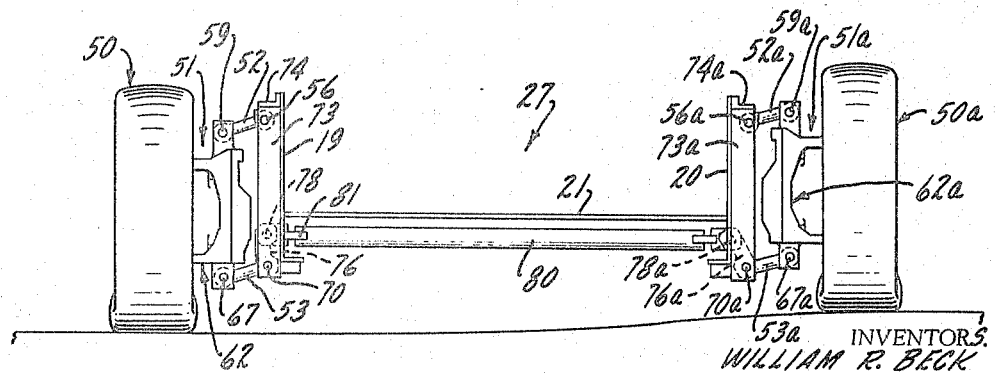

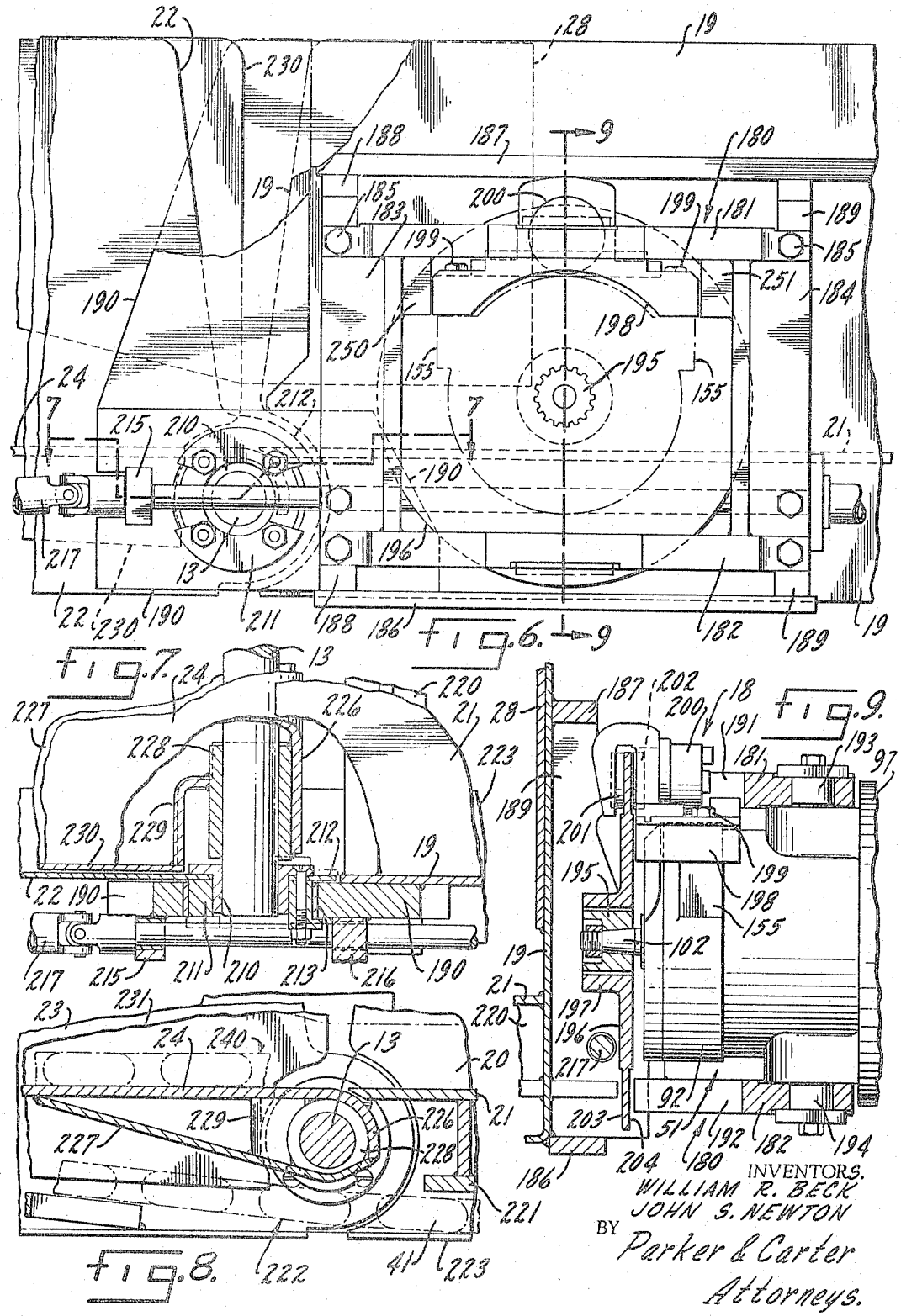

3,302,739
SHUTTLE CARS WITH SIX DRIVEN WHEELS
William R. Beck, Palos Heights, and John S. Newton, Glen Ellyn, Ill., assignors to Goodman Manufacturing Company, Chicago, Ill., a corporation of Illinois
Filed Nov. 19, 1963, Ser. No. 324,732
13 Claims. (Cl. 180—24)

This invention relates generally to haulage vehicles and a motorized wheel assembly, and specifically to a shuttle car especially adapted for use in underground mines.

Self-powered haulage vehicles have been known for a good many years. Commercially practical six wheel self-powered haulage vehicles are a relatively recent innovation however. The six wheel type of haulage vehicle, which is commonly known in the underground mining trade as a shuttle car, consists of a body which is articulated at or near its midpoint so that the car can maintain traction on uneven surfaces. Generally three pairs of wheels are employed, one pair at each end of the car and one pair at or adjacent the pivot point between the articulated body sections. The body sections form a trough which is generally open at each end. Material which is loaded into the trough or carrying chamber is discharged therefrom at a discharge point by an endless flight conveyor which moves over the load supporting surface on the bottom of the trough.

It appears to be the consensus of industry at the present time that the ultimate six wheel car has not been produced. Certain disadvantages in present shuttle cars have become apparent among which are the following:

Present cars have a relatively low live load to dead weight ratio. This is particularly true in four wheel shuttle cars where capacity is restricted by width considerations. There are many contributing factors. Heavy mountings are required for the motors. Heavy structural elements are required to give the car enough ruggedness to adequately meet the rugged service conditions and abuse to which the cars are subjected in underground use. The motor mountings and structural elements perform only a single function. Further, the motor and wheels are entirely separate units since the motor is generally located adjacent the center of the car and a power transmitting linkage extends forwardly and rearwardly to the steerable wheels. The linkage very materially increases the weight, complexity and cost of the cars.

The capacity of existing cars is not as great as mine operators would like. Due to the placement of the motors at the center of the car and the consequent transverse protrusion of the power transmitting and steering linkages, the load carrying width of the car is materially reduced. Even though only a few extra width inches for only a few feet of length are needed to accommodate the linkages, the entire width of the trough or load carrying chamber of the car must be narrowed, since the conveying chamber must be no wider than its narrowest dimension because of conveyor limitations.

The equalizer structures employed today have not been entirely satisfactory. It is frequently difficult to hold precise dimensions between the linkages on each side of the body.

Furthermore, present six wheel shuttle cars quite frequently create a plowing effect when run over mine floors which are covered with a substantial layer of dust. That is, since the center, non-steerable pair of wheels are powered in the conventional six wheel shuttle cars, the driving force is exerted in a direction parallel to the longitudinal axis of the car since the center wheels are aligned therewith. When turning, the sterrable wheels diverge from the angle of traction of the fixed center wheels with the result that the steerable wheels tend to plow in the loose dirt and dust.

Accordingly a primary object of the invention is to provide a six wheel, articulated shuttle car having a large carrying capacity and a high live load to dead weight ratio due to utilization of various component parts for dual functions.

Another object is to provide a six wheel articulated shuttle car having motorized wheels, the end pairs of wheels being steerable and the mid-pair of wheels being non-steerable and braked.

Another object is to provide a unique equalizer system especially adapted for a shuttle car, although it is contemplated it will have various other uses, which reduces wear and friction of the component parts and maintains the end points of the assembly, and thereby the wheels, in precise adjustment with one another to thereby maintain the wheels in firm driving contact with the ground at all times.

Another object is to provide a shuttle car in which longitudinal power transmitting linkages are eleminated.

Another object is to provide a motorized wheel assembly especially adapted for use in a shuttle car, although it may be easily adaptable to any machine requireing a motorized wheel, in which the wheel housing functions as a load carrying member thereby eleminating additional load carrying elements and reducing the overall weight of the car.

Yet a further object is to provide a motorized wheel assembly especially adapted for a shuttle car in which a motor shell or housing functions as a connecting link in a steering linkage thereby reducing the cost of the car, complexity of the steering linkage, and reducing the overall weight of the car.

Yet a further object is to provide a shuttle car having a plurality of motorized wheels, each wheel housing functioning as a wheel load carrying member, which is lower in cost, simpler, and has a greater live load to dead weight ratio than the existing six wheel shuttle cars.

A further object is to provide a six wheel shuttle car in which maximum turning radius is possible due to the absence of brakes or other space consuming structure adjacent the steering wheel.

A further object is to provide a six wheel shuttle car in which the plowing effect which is commonly encountered in dustry mine floor environments with existing six wheel shuttle cars is eliminated.

Another object is to provide a motorized wheel for use under rugged operating conditions in which the motor drive shaft is flexibly mounted to the motor to thereby accommodate maximum misalignment between the first stage wheel gearing and motor pinion.

Yet a further object is to provide a motorized wheel assembly for use under rugged operating conditions in which the wheel gearing is floatable with respect to the wheel center and the motor drive shaft to thereby provide even load distribution, and even wear and long life of the gearing.

A further object is to provide a motorized wheel assembly in which the floating wheel power gearing is driven by a flexibly mounted motor drive shaft to thereby provide maximum shock absorption capabilities.

A further object is to provide a shuttle car in which the equalizers are combined with the motor hanger to thereby reduce slop and play in the equalizers, reduce wear and friction, and maintain good driving contact with the supporting surfaces.

Yet a further object is to provide a shuttle car in which the same motorized wheel unit may be employed for each wheel, thereby reducing to one the number of spare wheel units needed to keep the car in continuous operation.

A further object is to provide a motorized wheel assembly in which a centered, driven gear element is floatably mounted in both radial and longitudinal directions so as to be able to freely seek its own center when in engagement with a plurality of driven gear elements.

Yet a further object is to provide a motorized wheel assembly consisting of a motor and a wheel, said motor having a power output shaft connected to the motor intermediate the ends of the motor armature to thereby provide excellent flexibility to the shaft in conjunction with controlled torsional stress.

Other objects and advantages of the invention will become apparent upon a reading of the following description of the invention.

The invention is illustrated more or less diagrammatically in the accompanying drawings wherein:

FIGURE 1 is a top plan view of the shuttle car showing the steerable wheels in a maximum turn position;

FIGURE 2 is a side elevation of the shuttle car;

FIGURE 4 is a perspective view with parts broken away and others omitted for clarity of the right front wheel of the shuttle car of FIGURE 1 in a turn position;

FIGURE 5 is a view of the equalizer system associated with a set of wheels;

FIGURE 6 is a partial elevation of one side of the shuttle car with portions broken away and others indicated in phantom, showing the areas adjacent the common pivot between the body sections;

FIGURE 7 is a sectional view with portions broken away taken substantially along the line 7—7 of FIGURE 6 further showing the articulated connection between the body sections and illustrating particularly the bearing support for the pivot cross-shaft;

FIGURE 8 is a sectional view taken substantially along the line 8—8 of FIGURE 1 with parts shown in outline; and FIGURE 9 is a detailed sectional view taken substantially along the line 9—9 of FIGURE 6 showing particularly the brake means associated with one of the wheels in the center set of wheels.

Like reference numerals will be used to refer to like parts in separate figures throughout the following description of the drawings.

Body structure

Figure 3:
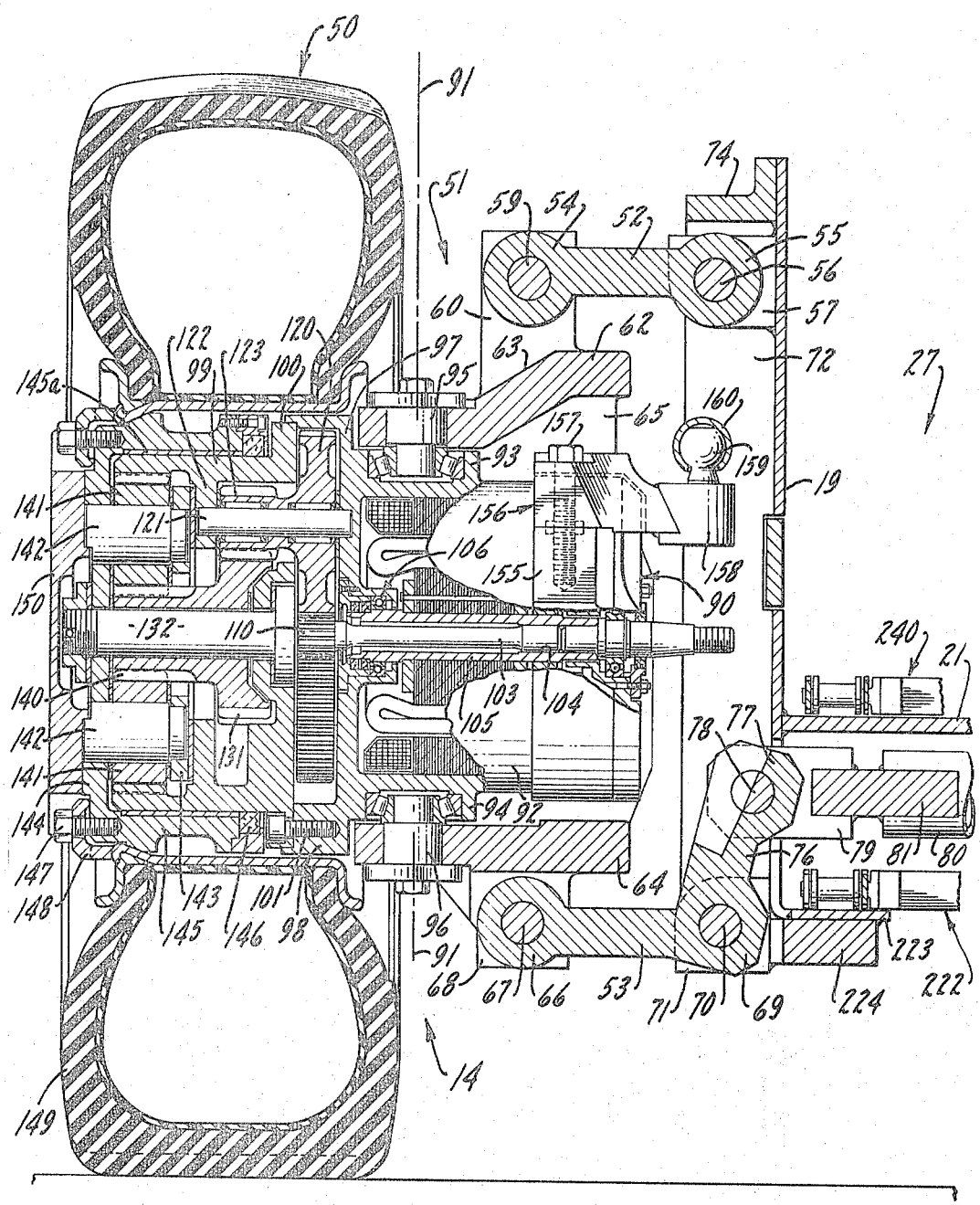
FIGURE 3 is a section through a motorized wheel assembly taken substantially along the line 3—3 of FIGURE 2.

The shuttle car is indicated generally at 10 in FIGURES 1 and 2. It consists essentially of a pair of body sections 11 and 12 which are articulately connected to one another for flexing movement in a generally vertical plane about a common pivot 13. A set of steerable wheel assemblies 14 and 15 are located at the forward or front end of the body, in this instance body section 12. A second set of steerable wheel assemblies 16 and 17 are located at the rear of the body. A third set of wheel assemblies 18 and 18a are located at the approximate mid-point of the body, the mid set of wheels being non-steerable.

It should be understood that although a pair of wheels is shown as comprising each set, the term "set" is not confined to such an arrangement. It is entirely possible that each wheel assembly may include two or even more tires. The provision of additional wheels might be particularly desirable when the car is intended for operation on soft bottoms. The principles of operation and the description of the invention can be most easily described by a showing of only a single wheel associated with each assembly, and for this reason only one wheel per each wheel assembly has been shown. Likewise, although the center set of wheel assemblies 18 and 18a have been shown as located off-center from the pivot means 13 it is entirely possible that this set of wheel assemblies could be located at any desired position intermediate the end set of wheels. The center set might, for example, under certain conditions, be located in axial alignment with the pivot means or pivot shaft 13. It is contemplated however that it will be most advantageous to offset the center set of wheels from the pivot means since this generally results in a considerably simpler structure and better space utilization.

Front loading body section 12 includes a pair of generally vertical, parallel side walls 19 and 20 which are welded or otherwise suitable secured to a bottom plate or wall 21. Rear or discharge body section 11 includes a pair of outer side walls 22 and 23, and a pair of inner load contacting side walls 230 and 231 which are welded or otherwise suitably secured to a bottom plate or wall 24. The load contacting walls and bottom plates of body sections 11 and 12 form generally U-shaped material carrying chambers 25 and 26 respectively, the chambers together forming an elongated articulated generally U-shaped carrying trough 27. A pair of offset overlap plates 28 and 29 are welded to walls 19 and 20 of forward section 12 respectively and extend rearwardly past the area of overlap of the body sections. The overlap plates are welded to the upstream end of the carrying chamber 26 so that material, such as coal, when moved rearwardly by the flight conveyor 40 will be deflected away from the overlap area between the sections thus eliminating a major source of clogging between the sections. The terms "upstream" and "downstream" in this application are used in the context of the normal direction of flow of material through the body, which is from right to left as viewed in FIGURES 1 and 2.

A bumper structure 30 extends about the forward end of the car. A cable reel mounting bracket 31 extends outwardly from one of the rear sides of the car, preferably the side opposite the driver's side. The bracket carries a plurality of cable sheaves 32, 33 and any suitable pay out and take up mechanism for electrical power cable. A plurality of side plates 34, 35, 36 extend outwardly from the side walls 23, 20 and 19 to shield operating components which are located along the sides of the car. An operator's compartment is indicated at 37, the compartment including a steering wheel 38 and a pair of seats F and R, one facing forwardly and the other rearwardly.

An endless slat conveyor, indicated generally at 40, traverses the length of the carrying trough 27. The conveyor consists essentially of a pair of link chains 41, 42 which move slats 43, 44, 45 and 46 over the bottom of the carrying trough.

Wheel assembly and equalizer system

Steerable wheel assembly 14 and its associated equalizer system is shown best in FIGURES 3, 4 and 5. The wheel assembly consists essentially of a wheel 50 and a motor unit 51, the motor unit 51 forming a load carrying portion of the equalizer system.

Equalizer system

Each wheel assembly is supported from and connected to the body frame by a parallelogram linkage which comprises a portion of the equalizer system for a set of oppositely spaced wheel assemblies. Referring particularly to FIGURE 3, the parallelogram linkage supporting wheel assembly 14 includes a pair of short upper and lower links 52 and 53. Link 52 is a generally triangularly shaped plate, shown best in FIGURE 4, which terminates at its outer end in a bearing sleeve 54 and at its inner end in a similar, longer bearing sleeve 55. Inner bearing sleeve 55 pivots about a pin 56 which is journaled in a pair of supporting brackets 57 and 58, see FIGURE 4, which are welded or otherwise suitably secured to side wall 19. The outer bearing sleeve 54 pivotally receives the pivot pin 59 which is journaled at its ends in a pair of brackets 60, 61, the brackets extending upwardly from wheel carrier 62. The wheel carrier is essentially a triangularly shaped housing having an offset upper wall 63, a substantially planar lower wall 64 and tapered cut away exterior side walls 65, the exterior walls forming the apex of a roughly isoceles triangle in plan view.

Lower link 53, which may likewise be generally triangularly shaped, terminates at its outer end in a bearing sleeve 66 which receives a pivot pin 67. Pivot 67 is journaled in a pair of bracket 68, 68a which project downwardly from the bottom wall of wheel carrier 62.

The inner end of bottom link 53 terminates in a bearing sleeve 69 within which is pivot pin 70. Pivot pin 70 is journaled at its ends in a pair of flanges, only one of which, 71, is visible from FIGURES 3 and 4.

A housing consisting of outwardly extending plates 72, 73 and a top plate 74 covers the inner ends of the short links including the pivot pins 56 and 70. Pins 56 and 70 may additionally be journaled in the housing side walls 72 and 73, if desired, as best seen in FIGURE 4. As will appear more clearly hereinafter, the plates or walls 72, 73 also function as links in the equalizer system.

The lower short link 53 is actually one arm of a bell crank lever, the other arm of which is indicated at 76. The upper end or arm 76 terminates in a journaled bearing 77 which receives a pivot pin 78. The pin in turn is received in a pair of brackets 79 which slide through a cut away area in side wall 19. Pin 78 may be integral or rotatable with respect to its supporting lugs 79. A rigid spaced member 80 is rigidly secured to lug 79 by a rigid welded connector 81 or any other suitable means which will maintain the centers of pins 78 and 78a of FIGURE 5 a fixed distance apart at all times. Referring to FIGURE 5, those parts on the right hand wheel assembly which correspond to similar parts in the left hand assembly are indicated by the corresponding reference numerals with the subscript *a*.

It will be noted that the parallelogram linkages are composed of links, the corresponding links being identical in length and spatial relation to corresponding areas. Short link 52 is equal in length to link 52a and long link 72 is identical in length to long link 72a and so forth. It should also be understood that when referring to the lengths of the links, the end reference points are the center axes of the pivot pins 56, 59, 67 and 70. For convenience of further description the physical pins and their geometrical axes will hereafter be referred to by the same reference numerals.

Motor

Referring now to FIGURES 3 and 4 particularly, the motor housing and its associated structure connecting it to the parallelogram equalizer linkage will next be described.

The motor 90 is connected to the wheel carrier 62 for rotation about a generally upright axis 91. The motor includes a housing 92 within which are located the conventionally arranged windings. Upper and lower generally circular flanges 93 and 94 receive tapered roller bearings within which are journaled a pair of king pins 95 and 96. The king pins are axially aligned one with the other and are secured to the upper and lower walls of the wheel carrier by bolts, not numbered. Preferably the king pins are formed with an outer, generally elliptical shaped overhanging cover, a first stub section which is rotatably received in an aperture in the upper and lower carrier walls, and an inner, reduced diameter stub section which is received within the tapered roller bearings. Alternately the king pins may be formed of individual parts and connected together but in any event they are of substantial diameter and axially aligned with one another.

The motor housing 92 further includes a flange 97 which terminates in a longitudinally axised skirt 98. Flange 97 extends both radially inwardly and outwardly a substantial distance from the motor shell 92. A spindle 99 having a flange 100 is bolted as at 101 to skirt 98. The spindle supports the wheel 50 and contains the gearing for the wheel, as will shortly be described.

Motor 90 includes a flexibly mounted wheel drive shaft 103 which is shrink fitted, as at 104, to a center, rotatable shaft housing 105 within the motor, the shaft housing carrying the inner winding of the motor. The outer end of the shaft housing is journaled in a suitable bearing indicated generally at 106, the bearing being retained in an oil tight circular housing projecting in an inward direction from motor housing flange 97. A drive pinion 110 is mounted on the outer end of the flexible shaft 103.

For convenience of description, the terms "inter" and "outer" refer to directions determined by looking toward the longitudinal center of the car and outwardly therefrom, respectively.

Wheel

The driving gear for wheel 50 comprises a primary reduction gearing system, a secondary reduction gearing system, and a planetary gear system.

The primary reduction gearing system includes three reduction gears 120 spaced equidistantly from one another about motor drive pinion 110. Each of the reduction gears 120 is mounted on a shaft 121, the inner end of which is supported by the motor housing flange 97 and the outer end of which is supported in an internal flange 122 projecting radially inwardly from spindle or motor housing extension 99.

The secondary reduction gearing comprises three pinions 123, each of which is integral with an associated primary reduction gear 120. The pinions are meshed with a central gear 131 which turns about a main assembly bolt 132. Central gear 131 is free to float axially back and forth a slight distance between end thrust bearings which encircle the main assembly bolt 132. The thrust bearings throughout the wheel gearing are not numbered for purposes of clarity. The central gear is likewise free to rotate about the main assembly bolt 132 without contacting it, for there is a slight clearance between the bolt and the internal surface of gear 131. In other words, central gear 131 is floatably mounted both longitudinally and in all radial directions within limits. The longitudinal float is sufficient to enable the gear to center itself within three pinions 123 and within the planet gears of the planetary system which will next be described.

The planetary system comprises a sun gear 140 which is integral with central gear 131 and accordingly floatable with gear 131. Four planet gears 141, each of which is mounted on a stub shaft 142, rotate about the sun gear 140. The inner ends of the stub shafts are journaled in a suitably apertured bearing ring or plate 143 and the outer ends are journaled in wheel hub 144.

Wheel hub 144 is a generally cup-shaped member, the longitudinal portion 145 of which extends inwardly to a seal 146. The wheel hub rotates about a sleeve bearing 145a which encircles the spindle 99.

The wheel hub 144 is connected by bolts 147 to a bearing ring 148 upon which is mounted the inflatable pneumatic tire 149. A wheel cover 150 is secured by bolts or any other suitable means to the wheel hub 144 and is rotatable therewith. Wheel cover 150 may be plugged at one or a plurality of locations to thereby drain lubricant from the gearing system. It will be understood that the gears rotate in a bath of oil, the bath extending from wheel cover 150 inwardly to the shrink fitted area 104 of the motor power shaft.

A pair of ears 155 extend outwardly from the upper, inner end of the motor housing 92. A steering arm 156 is bolted to the ears by bolts 157. The arm carries, at its inner end, an extension 158 from which a steering ball 159 projects upwardly. A ball socket end 160, carried at the end of a steering drag link 161, shown best in FIGURE 4, is fitted about the steering ball 159. The outer end of drag link 161 is pivotally connected by a pin 162 to an extension 163 from a gear housing 164. Extension 163 and that portion of the gearing in housing 164 to which it is connected may be pivotable with shaft 165. A pair of pivot ears 166 and 167 extend outwardly from the gear housing 164 and carry a pivot pin 168 to which is pivotally attached the outer end of piston rod 169 of hydraulic cylinder 170. The upper end of the cylinder is pivotally connected, as at 171, to supporting structure indicated generally at 172. Rotation of steering wheel 38 by the operator will, through a suitable steering linkage, cause rotation of the gears in housing 164. Rotation of the gears in housing 164 rotates extension 163, and with it drag link 161. Movement of drag link 161 swings the entire wheel assembly about axis 91 and king pins 95 and 96. Each of the side plates 65 of wheel carrier 62 is cut away, as at 175, to enable the motor to swing freely about king pins 95 and 96.

Only enough steering linkage has been illustrated and described to make clear the support and mode of operation of the wheel assembly. The specific steering linkage illustrated does not, by itself, comprise the presently disclosed invention. It may advantageously be a system similar to that disclosed and claimed in copending application Serial No. 324,770 filed November 19, 1963 by William G. Bunchak which application is assigned to the assignee of this application.

*Center wheels*

Referring now to FIGURES 3, 6 and 9, and particularly FIGURES 6 and 9, the motor portion 51 of non-steerable wheel assembly 18 is identical to the motor portion of the steerable wheel assembly 14 with the modifications described hereinafter.

The non-steerable wheel assembly 18 is supported from a box frame structure indicated generally at 180. The frame includes a pair of upper and lower frame members 181, 182 which are welded to a pair of L-shaped side channel members 183, 184. This box shaped frame is secured by mounting structure to the side wall 19 of the forward body section. Connecting means, such as bolts 185 which are received in holes, not shown, in the mounting structure position the frame on the side wall. The mounting structure includes a pair of spaced, outwardly extending locating members 186, 187 which are welded to the outside of the side wall 19 and two pairs of vertical spacers 188, 189. The pairs of spacers 188, 189 space the box frame 180 outwardly from side wall 19 a distance sufficient to clear the articulating structure illustrated best in FIGURES 6 and 7, particularly the connecting block 190.

Outwardly extending upper and lower frame members 181 and 182 may be identical in configuration and, as best shown in FIGURE 9, have cut away areas 191 and 192, the former of which provides clearance for brake means which will be discussed hereinafter. The motor portion 51 of the wheel assembly 18 is connected to the upper and lower frame members 181 and 182 by a pair of pins 193, 194. Since the wheel assembly is not intended to steer, a pair of positioning blocks 250 and 251 are butted against the arcuate collar or brake arms.

A spline 195 is fixably secured to the inner end 102 of motor shaft 103. The spline is in driving engagement with a circular brake disc 196, the hub 197 of which is internally splined to receive, and rotate with, the externally splined member 195.

An arcuate collar 198 is bolted, as by bolts 199, to the outwardly projecting ears or lugs 155 of the motor housing 92. The collar carries a brake cylinder 200 having a pair of brake pads or shoes 201 and 202. The brake pads are aligned with the braking surfaces 203 and 204 formed about the outer edge of brake disc 196. When the brake cylinder 200 is actuated by any suitable means under control of the operator, the pad 202 is extended. Brake pads 201 and 202 are thereby caused to make frictional engagement with the splined, slidable brake disc 196 to lock the center wheels against further rotation.

*Body pivot structure*

The pivot means for articulately connecting the body sections to one another will next be described.

Referring first to FIGURES 1, 6 and 7, it will be noted that side walls 19 and 22, and 20 and 23, are coplanar with one another and the downstream end of body section 12 is supported by the center set of wheel assemblies 18 and 18a.

A connecting block is indicated generally at 190. The connecting block is welded to side wall 19 but not side wall 22, and has an irregular configuration as can be most readily appreciated from FIGURE 6. Block 190, and several other members in FIGURES 6 and 7 have been identified more than once by their reference numerals to give an indication of their contour. The outer end of pivot cross shaft 13 is received in a flanged bushing 210. The bushing is bolted to another ring bushing 211, the bushings receiving a forwardly projecting portion 212 of side wall 22 between their area of radial overlap. A sleeve bearing is indicated at 213 between outer bushing 211 and connecting block 190. Side wall 22, and thereby the downstream section 11, is thereby made articulatable with respect to upstream section 12, both sections being pivotable about pivot shaft 13.

A pair of bearing brackets 215 and 216 are welded to and extend outwardly from the outside surface of bearing block 190. The bearing brackets receive steering linkage 217 which passes behind the outwardly extending flange portions of L-shaped channed members 183 and 184, the steering linkage terminating at the steerable wheel assemblies.

The construction of the bottoms of body sections 11 and 12 respectively will now be described.

Bottom plate 21 of front body section 12 is welded along its edges to side wall 19, as is best seen in FIGURE 9. A plurality of stiffening structures consisting of inverted T-shaped struts 220 are similarly welded at the ends to side walls 19 and 20 and, along their upper edge to the lower surface of bottom plate 21. See FIGURES 7–9. The horizontal flange 221 of each strut is located above pan flange 223 a distance sufficient to receive the return run 222 of link chain 41. The chain slides along the inturned pan flange 223 from the side wall. It will be noted in FIGURE 3 that a reinforcing block 224 is welded to the bottom of the pan flange at the equalizer entry areas in the side wall to provide additional reinforcement.

The upstream end of bottom plate 24 of downstream body section 11 is curved as at 226 and welded to a stiffener plate 227, as best seen in FIGURE 8. The trailing or downstream edge of the stiffener plate 227 is welded to the lower surface of bottom plate 24. A downturned portion 226 of the bottom plate 24 is welded to a bearing sleeve 228 which receives pivot shaft 13 and terminates, at its outer end, just short of the flange of inner bushing 210. A spacer or stiffener member 229 is welded at its upstream end to sleeve 228 and, at its outer end, to rearwardly extending side wall 230. It will be noted, particularly from FIGURES 7 and 8, that bottom plate 24 is welded along its edges to side plates 230 and 231, these plates being located slightly closer together than forward side walls 19 and 20. The outermost extremities of the upper run 240, see FIGURE 3, and lower run 222 of the slat conveyor are spaced inwardly from the walls of both body sections a distance sufficient to clear the side plates 230 and 231 of body section 11.

*Use and operation*

The use and operation of the invention is as follows:
In operation, the operator controls steering wheel 38 from forwardly facing seat F. As the car traverses the floor, any vertical irregularities in a longitudinal direction are compensated for by pivoting movement of the forward body section 12 about the axis of pivot shaft 13 with respect to rearward body section 11. This pivoting movement is accomplished by structure shown best in FIGURES 6, 7 and 8, in which the forward body section 12 is pivotally connected to the rear body section 11 by bearing bushing 213. The rearward and forward body sections are connected to one another by means of bolted, opposed bushings 210, 211, associated with connecting block 190, the forward body section being welded directly to block 190 as best shown in FIGURE 7.

Travel of the car over uneven surfaces, which causes vertical displacement between opposite wheels in each set of wheels, that is vertical displacement in a direction transverse to the longitudinal axis of the car, is accommodated by the equalizer system illustrated best in FIGURES 3 and 5. Referring to FIGURE 5 for example, each of the wheel assemblies is supported by a dimensionally and angularly identical parallelogram linkage consisting, respectively, of sets of upper and lower links 52, 53 and 52a, 53a, and a set of equal length substantially vertical links 59–67, 73 and 59a–67a, 73a. The parallelogram linkages are tied together by a spacer member 80 which is bodily rigid between the points of its connection to the parallelogram linkages. The spacer member 80 is connected by pivot pins 78, 78a to rigid extension 76, 76a extending upwardly from the lower innermost end of the bottom short links. As a practical matter the extensions 76, 76a are most advantageously formed as the upper end of two identically shaped, but oppositely positioned, bell crank levers.

When the set of steerable wheels rests upon a level surface, as in FIGURE 1, the angle which each bell crank lever arm makes with a vertical line drawn through pivot point 70 or 70a is equal, though reflected in position.

Referring now to FIGURE 5, and assuming the wheel to be positioned on terrain which is higher at the right side than the left, the short links 52a and 53a will be swung counterclockwise around their pivot points until bracket extension or upwardly extending bell crank lever arm 76a is swung inwardly to its FIGURE 5 position. Since the bell crank lever extension arm 76 is tied to arm 76a by the rigid spacer member 80, lower arm 53 will similarly be rotated counterclockwise about its pivot 70 and the entire parallelogram linkage associated with the left wheel will be displaced a distance substantially equal to that displaced by the right hand parallelogram linkage. The result will be the maintenance of the bottom plate 21 at a substantially horizontal position even though the support surfaces for the wheels are displaced vertically with respect to one another. At the same time, the wheels will continue to make firm engagement with the ground and thereby provide equal traction.

When the operator turns wheels 38 to steer the car, steering linkage 217 transmits a steering impulse forwardly or rearwardly, as the case may be, and this shifted position is reflected in an appropriate forward or backward movement of link 161 of FIGURE 4. The terminal end 160 of link 161 is connected to steering ball 159 which in turn is integral with motor assembly 51 and wheel assembly 50. Movement of the steering ball 159 rotates the motor, and thereby the wheel, about king pins 95 and 96. Flexible power lines leading to motor 90 enable the motor to swing freely without the use of any complicated linkage movement accommodating connections which otherwise would be necessary when the power source for the wheels is located adjacent the center of the car.

The wheel drive end 103 of the motor power shaft terminates in a radially floatable drive pinion 110 by virtue of the connection of the inner end of the flexible drive shaft to a central housing 105 intermediate the ends of the motor armature. Power from pinion 110 is transmitted to tire 149 through primary reduction gears 120, secondary reduction gears 123, and the planet gear system 140 and 141. Sun gear 140 is longitudinally and radially floatably mounted with respect to the axis of the motor housing so that the wheel can actually wobble in all directions without causing undue stresses in the motor drive shaft. At the same time, load is transferred through the king pins and the motor housing to the wheels since the motor extension 99 is in effect integral with the motor housing 92 through which the load is transferred.

Other modifications will become apparent to those skilled in the art upon a further study of the disclosure. It is in the intention that such other modifications be included within the spirit of the invention and that the scope of the invention be measured solely by the scope of the appended claims when construed in the light of the pertinent prior art.

We claim:
1. A haulage vehicle having a maximum width material carrying chamber for a given overall body width, said vehicle including, in combination,
a plurality of articulately connected body sections each of which has a pair of side walls and a bottom to form an upwardly open material carrying chamber, the lower portion of which is of substantially constant width,
wheel means associated with the body sections in load supporting relationship therewith, said wheel means including
a set of wheels associated with each end portion of the vehicle,
each wheel in each set of end wheels being characterized in that
firstly, it is non-braked, and
secondly, it is steerable, each of said end wheels being swingable about a substantially vertical axis which is located between the inner side of the wheel tire and the side of the adjacent body section,
a set of wheels associated with the body sections intermediate the end sets of steerable, non-braked wheels, the inner face of each wheel of each of said sets of wheels being equally outwardly spaced from the adjacent side wall with the wheels on each side of the vehicle being in longitudinal alignment,
each wheel in each set of intermediate wheels being characterized in that
firstly, it is provided with brake means, and
secondly, it is non-steerable, each of said intermediate wheels being spaced outwardly from the side of the adjacent body section a distance sufficient to accommodate brake means between the intermediate wheel and the side of the adjacent body section, which side is located no closer to the center axis of the vehicle than the sides of the body sections adjacent the end wheels, each of said wheels driven by a motor individual thereto, each of said motors being disposed in the space between said inner face of the wheel and the adjacent side of a corresponding section and within the peripheral confines of said wheel, said brake means being disposed between said motor and said side of the adjacent body section to thereby provide a material carrying chamber of maximum width within the fixed overall width limitation of the vehicle.

2. The articulated haulage vehicle of claim 1 further characterized in that the braking capacity of the non-steerable wheel assemblies is sufficient to accommodate the entire haulage vehicle.

3. The haulage vehicle of claim 1 further including means for maintaining the distance between opposite sets of steerable wheel assemblies substantially constant in all positions of said opposite sets of wheel assemblies with respect to one another, said means including a parallelogram linkage connecting each wheel assembly to an associated section of the articulated body, and an equalizer structure, each equalizer structure having its end portions pivotally connected to opposite linkages, each equalizer structure being bodily rigid from end to end, and from the point of pivotal connection to one linkage assembly to the point of pivotal connection of the opposite linkage assembly, whereby each increment of movement of one parallelogram linkage is concurrently and substantially identically reflected in the opposite parallelogram linkage.

4. The haulage vehicle of claim 3 further characterized in that the end of each equalizer structure is connected to its associated linkage assembly by an extension from a link of the linkage assembly, the angularity of each of said extensions with respect to the link from which it extends being constant in all operative positions of the linkage.

5. The haulage vehicle of claim 4 further characterized in that the point of connection of each extension to its associated equalizer structure is rotatable about the same pivot about which its associated link is rotatable.

6. The articulated body shuttle car of claim 1 further characterized in that each of said motors having a motor frame, a wheel carrier for each steerable wheel assembly secured to its associated body section, and pivot means for connecting each motor frame, and thereby the motor and its associated wheel, to an associated wheel carrier whereby load ois transmitted from the associated body section to the wheel through the motor frame.

7. The articulated body shuttle car of claim 6 further characterized in that each wheel carrier extends outwardly from the body a distance sufficient to locate a substantial portion of the motor inwardly from the pivot means, each wheel carrier having sufficient internal clearance to enable that portion of the motor located inwardly from the pivot means to rotate freely about the pivot means inwardly therefrom.

8. The articulated body shuttle car of claim 6 further characterized in that the pivot means are a pair of vertically axially aligned king pins.

9. The articulated body shuttle car of claim 6 further characterized by and including the non-steerable and the steerable wheel assemblies being identical, and structure for connecting each non-steerable wheel to the associated body section, said structure including a pair of generally vertical, axially aligned, connecting pins connecting the non-steerable motor frame to upper and lower body extensions at a distance from the associated body section sufficient to provide clearance for brake means between the associated body section and the wheel assembly.

10. The haulage vehicle of claim 1 further characterized in that each of the substantially vertical axes about which each of the end wheels swings is substantially nearer its wheel tire than the adjacent body section.

11. A haulage vehicle having a maximum width material carrying chamber for a given overall body width, said vehicle including a plurality of articulately connected body sections which form an upwardly open material carrying chamber, at least the lower portion of which is of substantially constant width, wheel means associated with the body sections in load supporting relationship therewith, said wheel means including a set of wheels associated with each end portion of the vehicle, each of said sets of end wheels including a pair of wheels located opposite one another at one end portion of the vehicle, a set of wheels associated with the body sections intermediate the end sets of wheels, said set of intermediate wheels including a pair of wheels located opposite one another, the wheels in each of the aforesaid sets of wheels flanking the material carrying chamber and the wheels on each side of the vehicle being in longitudinal alignment, and means for minimizing the clearance space between each wheel and the adjacent portion of the closest body section, and thereby maximizing the width of the material carrying chamber, said means including an individual motor for each wheel, each motor being carried by a mounting structure carried by the vehicle, each motor projecting inwardly from its associated wheel, each motor having shaft means, the shaft means for the motor of each intermediate wheel projecting inwardly from the motor adapted to receive brake means in the space between the motor and the adjacent side of the material carrying chamber, brake means mounted on the shaft means which project inwardly from the motor of each intermediate wheel.

12. An articulated body shuttle car, said shuttle car including, in combination, a pair of body sections, structure connecting the body sections to one another to thereby form a body articulatable only in a vertical plane about a common pivot, said sections forming a continuous, generally U-shaped material carrying trough, and three sets of wheel assemblies associated with the body in load supporting relationship therewith, said sets of wheel assemblies including a set of steerable, self-powered wheel assemblies at each end of the body, each set consisting of a par of wheel assemblies, one wheel assembly on each side of the body, and a set of non-steerable, self-propelled wheel assemmlies adjacent the articulated connection between the body sections, each of the steerable wheel assemblies being non-braked, each of the non-steerable wheel assemblies being braked, each of the steerable wheel assemblies comprises a motor drivingly connected to a wheel,
each of said steerable wheel motors being mounted for rotational movement about a generally vertical axis within a wheel carrier connected to the body,
each of the non-steerable wheel assemblies comprises a motor drivingly connected to a wheel,
each of said non-steerable wheel motors being fixedly mounted to the body, and
brake means for each non-steerable wheel assembly mounted between the non-steerable wheel motor and the body in the area correspondingly occupied by the wheel carriers of the steerable wheel assemblies.

13. The articulated body shuttle car of claim 12 further characterized in that the wheel assemblies are identical.

References Cited by the Examiner

UNITED STATES PATENTS

| | | | |
|---|---|---|---|
| 866,410 | 9/1909 | Walker | 180—43 |
| 1,023,045 | 4/1912 | Shipley | 180—23 |
| 2,358,236 | 9/1944 | Lee. | |
| 2,770,377 | 11/1956 | McCallum | 214—83.35 |
| 2,802,542 | 8/1957 | Gerst | 180—75 |
| 3,161,172 | 12/1964 | Kassbohrer | 180—24 X |
| 3,175,709 | 3/1965 | Sibley | 280—6.11 X |
| 3,183,017 | 5/1965 | Lundquist | 214—83.35 X |
| 3,183,991 | 5/1965 | Gamaunt | 180—24 |
| 3,185,324 | 5/1965 | Breithaupt et al. | 180—22 X |

A. HARRY LEVY, *Primary Examiner.*